US007444346B2

(12) United States Patent
Bearden et al.

(10) Patent No.: US 7,444,346 B2
(45) Date of Patent: Oct. 28, 2008

(54) SYSTEM AND METHOD FOR SIMPLE OBJECT ACCESS PROTOCOL ACCESS TO INTERFACE DEFINITION LANGUAGE BASED SERVICES

(75) Inventors: Brian O'Neal Bearden, Webster Groves, MO (US); William Scott Bertrand, Belleville, IL (US); Keneth L. McGarrahan, Fenton, MO (US); Jonathan Chester Gathman, Arnold, MO (US)

(73) Assignee: AT&T Intellectual Property I.L.P., Reno, NV (US)

( * ) Notice: Subject to any disclaimer, the term of this patent is extended or adjusted under 35 U.S.C. 154(b) by 358 days.

(21) Appl. No.: 11/140,576

(22) Filed: May 27, 2005

(65) Prior Publication Data

US 2006/0271570 A1 Nov. 30, 2006

(51) Int. Cl.
*G06F 17/30* (2006.01)

(52) U.S. Cl. ................... 707/101; 707/102; 707/103 R; 707/104.1

(58) Field of Classification Search ................. 707/100; 715/700–866
See application file for complete search history.

(56) References Cited

U.S. PATENT DOCUMENTS 6,757,899 B2 * 6/2004 Zhdankin et al. ............ 719/315
6,898,604 B1 * 5/2005 Ballinger et al. ............ 707/101
6,961,735 B2 * 11/2005 Gargya et al. ............ 707/104.1
7,013,311 B2 * 3/2006 Hui et al. ............. 707/104.1
7,085,756 B2 * 8/2006 Carey et al. .................... 707/3
7,127,700 B2 * 10/2006 Large ......................... 717/100
2002/0099738 A1 * 7/2002 Grant ......................... 707/513
2004/0078788 A1 * 4/2004 Wong ......................... 717/140
2004/0201600 A1 * 10/2004 Kakivaya et al. ............ 345/700
2004/0205545 A1 * 10/2004 Bargeron et al. ............ 715/512

OTHER PUBLICATIONS

Corba to WSDL/SOAP Interworking Specification, Object Management Group (OMG), Nov. 2003 Version 1.0, formal/Mar. 11, 2002.*
Mapping CORBA and SOAP (http://dsrg.mff.cuni.cz/teaching/seminars/2000-10-31-kalibera-corba-saop/referat.html.*
Object Management Group (OMG) publication on Nov. 2003, Version 1.0, formal/Mar. 11, 2002, title: CORBA to WSDL/SOAP Interworking specification.*
Simple Object Access Protocol (SOAP) 1.1, Box et al (W3C Note May 8, 2000).*

* cited by examiner

*Primary Examiner*—Pierre M. Vital
*Assistant Examiner*—Augustine Obisesan
(74) *Attorney, Agent, or Firm*—Toler Law Group

(57) ABSTRACT

The disclosure is directed to a method of mapping an interface definition language (IDL) based communication to a simple object access protocol (SOAP) based communication. The method includes receiving an IDL schema to be mapped to an XML schema and processing the IDL schema. The IDL schema may be processed to identify IDL identifiers having an added prefix, an IDL union element having a boolean discriminator type, or an IDL interface type that includes a constant string. The method may also include mapping each of the IDL identifiers by removing the added prefixes, an optional element of the IDL union element to a first XML schema type having different minimum and maximum occurs values, or the IDL interface type by creating an XML schema enumeration having a value set to a string value of the constant string. The method further includes generating the XML schema.

25 Claims, 11 Drawing Sheets

200
202 NETWORK RESOURCES
204 ·PROCUREMENT ·HUMAN RESOURCES ·FINANCE ·EDW
206 OPERATIONAL SUPPORT SYSTEMS ALL LINES OF BUSINESS ·ORDERING ·PROVISIONING ·ASSURANCE ·MARKETING ·BILLING ·WORK ADMIN ·DISPATCHING ·MONITORING
208 EXTERNAL SUPPLIERS / PROVIDERS ·WILLIAMS ·CONCENTRIC ·COMPAQ ·IXCs ·DELL ·PRODIGY ·AOL ·ILECs
210 BUSINESS INTEGRATION SERVICES
Product Mgmt 212 | Customer Info Mgmt 214 | Order/SR Mgmt 216 | Network Resource Mgmt 218 | Service Mgmt 220 | Location Info Mgmt 222 | Usage Mgmt 224 | Rating and Pricing 226 | Bill Prep 228 | Trouble Admin 230
232 BUSINESS APPLICATION SERVICES
234 CUSTOMER CARE
236 Mass Market Sales Negotiation | 238 Large Business Complex Ordering | 240 Problem Resolution | 242 Self Service | 244 Convergent Info Inquiry
246 PROVIDER CARE 248 Supplier / Partner Administration
260 DISTRIBUTED COMPUTING INFRASTRUCTURE
250 Desktop Applications | 252 Web Browsers | 254 IVR | 256 Interconnect

SYSTEM AND METHOD FOR SIMPLE OBJECT ACCESS PROTOCOL ACCESS TO INTERFACE DEFINITION LANGUAGE BASED SERVICES

FIELD OF THE DISCLOSURE

This disclosure, in general, relates to systems and methods for simple object access protocol (SOAP) access to interface definition language (IDL) based services.

BACKGROUND

Large businesses have turned to integrated enterprise architectures for performing business functions. These integrated enterprise architectures are typically object-oriented based enterprise systems that integrate different business systems, such as databases, legacy systems and object-oriented applications, into an integrated computer architecture. Such integrated enterprise architectures are useful in telecommunications systems. Typically, these integrated enterprise architectures include object request brokers that use an interface definition language (IDL) to communicate between objects written in different programming languages. However, such architectures are difficult to integrate with web services.

Web services systems are designed to provide interfaces via hypertext transfer protocols (HTTP). Generally, web services provide mark-up language documents, such as hypertext mark-up language (HTML) and extensible mark-up language (XML), via networks using HTTP. As such, these web services systems are more adapted for using XML and HTTP and have turned to use of simple object access protocol (SOAP) for one program to communicate with a different program using HTTP and XML for information exchange.

Translation between SOAP and IDL based systems, such as Object Management Group (OMG) IDL based systems, is often unreliable and inefficient. Typical methods for translating from OMG IDL to SOAP lead to bulky inefficient XML schemas. As such, an improved system and method of communicating OMG IDL-based enterprise architectures and SOAP interfaces would be desirable.

BRIEF DESCRIPTION OF THE DRAWINGS

The present disclosure may be better understood, and its numerous features made apparent to those skilled in the art by referencing the accompanying drawings.

The use of the same reference symbols in different drawings indicates similar or identical items.

SUMMARY

Figure 1:
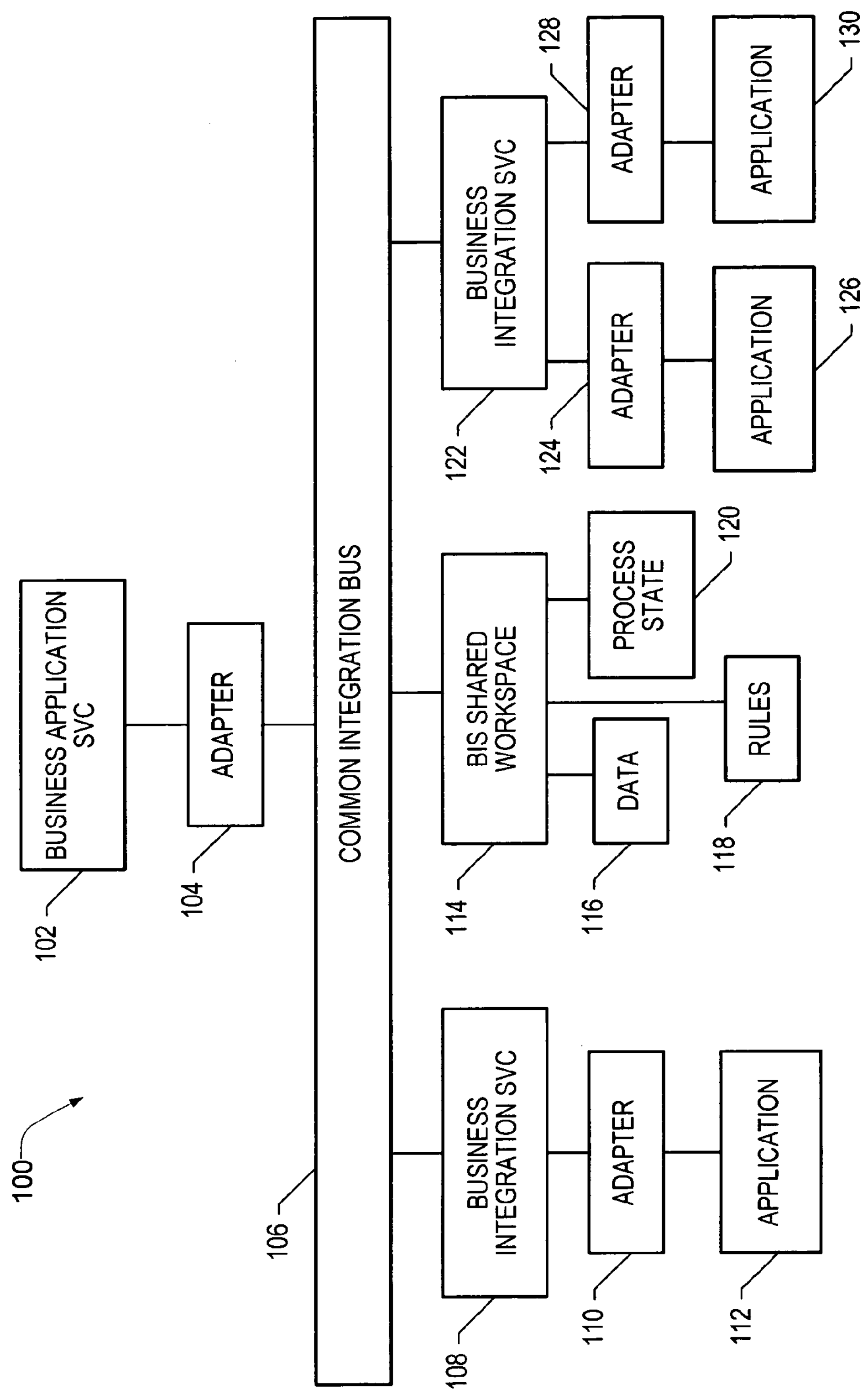
FIGS. 1, 2, 3 and 4 include illustrations of exemplary embodiments of enterprise architectures.

In one particular embodiment, the disclosure is directed to a method of mapping an interface definition language (IDL) based communication to a simple object access protocol (SOAP) based communication. The method includes receiving an IDL schema to be mapped to an XML schema and processing the IDL schema. The IDL schema may be processed to identify IDL identifiers having an added prefix, to identify an IDL union element having a boolean discriminator type and a portion that indicates an optional element, or to identify an IDL interface type that includes a constant string. The method may also include mapping each of the IDL identifiers having the added prefixes by removing the added prefixes to produce prefix-less identifiers, mapping the optional element of the IDL union element to a first XML schema type having a minimum occurs value that differs from a maximum occurs value, or mapping the IDL interface type to a second XML schema type by creating an XML schema enumeration having a value set to a string value of the constant string. The method further includes generating the XML schema including the prefix-less identifiers, the first XML schema type including the minimum occurs value and the maximum occurs value, or the second XML schema type including the XML schema enumeration. The XML schema is for use with the SOAP based communication.

In another embodiment, the disclosure is directed to a method of mapping an object request broker interface definition language (IDL) based communication to a simple object access protocol (SOAP) based communication. The method includes receiving an IDL schema to be mapped to an XML schema and processing the IDL schema to identify identifiers having an added prefix. The added prefix added to avoid a naming conflict with respect to a type within the IDL schema. The method further includes mapping each of the IDL identifiers having the added prefixes by removing the added prefixes to produce prefix-less identifiers and generating the XML schema to include the prefix-less identifiers. The XML schema is for use with the SOAP based communication.

In a further embodiment, the disclosure is directed to a method of mapping an object request broker interface definition language (IDL) based communication to a simple object access protocol (SOAP) based communication. The method includes receiving an IDL schema to be mapped to an XML schema, processing the IDL schema to identify an IDL union element having a boolean discriminator type and a portion that indicates an optional element, mapping the optional element of the IDL union element to an XML schema element with a minimum occurs value that differs from a maximum occurs value, and generating the XML schema to include the XML schema element. The XML schema is for use with the SOAP based communication.

The disclosure is also directed to a method of mapping an object request broker interface definition language (IDL) based communication to a simple object access protocol (SOAP) based communication. The method includes receiving an IDL schema to be mapped to an XML schema, processing the IDL schema to identify an IDL interface type that includes a constant string, mapping the IDL interface type to an XML schema type by creating an XML schema enumeration having a value set to a string value of the constant string, and generating the XML schema to include the XML schema enumeration. The XML schema is for use with the SOAP based communication.

In addition, the disclosure is directed to a method of mapping an object request broker interface definition language (IDL) based communication to a simple object access protocol (SOAP) based communication. The method includes receiving an IDL schema to be mapped to an XML schema, processing the IDL schema to identify an IDL union element having a non-boolean discriminator type, mapping the IDL union element to an XML schema sequence that includes optional members within the XML sequence, and generating the XML schema to include the XML schema sequence. The XML schema is for use with the SOAP based communication.

In another exemplary embodiment, the disclosure is directed to a method of mapping an object request broker interface definition language (IDL) based communications to a simple object access protocol (SOAP) based communication. The method includes receiving an IDL schema to be mapped to an XML schema, processing the IDL schema to identify an IDL sequence element, mapping the IDL sequence element to an XML schema type including a high maximum occurrence value, and generating the XML schema to include the XML schema type. The XML schema for use with the SOAP based communication.

In a further exemplary embodiment, the disclosure is directed to a proxy server system to map interface definition language (IDL) based communication to a simple object access protocol (SOAP) based communication. The proxy server system includes a data input to receive IDL data items to be mapped to an XML data item, a data output to provide a SOAP output including the XML data item, and a processor responsive to the data input and coupled to the data output. The processor includes computer instructions to: process the IDL schema to identify IDL identifiers having an added prefix, to identify an IDL union element having a boolean discriminator type and a portion that indicates an optional element, or to identify an IDL interface type that includes a constant string. The process further includes computer instructions to map each of the IDL identifiers having the added prefixes by removing the added prefixes to produce prefix-less identifiers, map the optional element of the IDL union element to a first XML schema type having a minimum occurs value that differs from a maximum occurs value, or map the IDL interface type to a second XML schema type by creating an XML schema enumeration having a value set to a string value of the constant string. The processor also includes instructions to generate the XML schema including the prefix-less identifiers, the first XML schema type including the minimum occurs value and the maximum occurs value, or the second XML schema type including the XML schema enumeration. The XML schema is for use with the SOAP based communication.

A system that may use an IDL to SOAP proxy server is an enterprise architecture including a business application server (BAS) system, an infrastructure services system, and a business integrated services (BIS) system. The business application services (BAS) system communicates with the business integration services (BIS) system via the infrastructure services system. The infrastructure services system includes a proxy adapter that translates between simple object access protocol (SOAP) based communications and interface definition language (IDL) based communications. The proxy adapter typically receives a communication from a program using IDL and translates the communication into an extensible markup language (XML) document. Conversely, the proxy adapter may receive an XML document from an application using SOAP and translate that XML document into an IDL-based communication accessible to an object oriented program.

In one exemplary embodiment, the business applications services (BAS) system includes a web services application server that utilizes SOAP and the business integration services (BIS) system includes applications accessible using IDL-based communications, such as Object Management Group (OMG) IDL-based communications. The web services application server communicates via the proxy adapter included in the infrastructure services system, which in turn accesses the object oriented applications running on the business integrated services (BIS) system.

DESCRIPTION OF THE DRAWING(S)

FIG. 1 depicts a particular embodiment of an enterprise integration architecture 100. Such enterprise integration architectures 100 are particularly useful in telecommunications applications. The architecture 100 includes a business application service 102 in communication with a common integration bus 106 through an adaptor 104. In addition, a business integration service 108, a business integration service shared workspace 114, and a business integration service 122 are connected to the common integration bus 106.

In one exemplary embodiment, the business application service 102 includes one or more servers and includes client applications that request services from the business integration services 108 and 122 and the business integration service shared workspace 114. Users may access various data and perform various functions associated with the business integration services tier by using the business application service 102. The business integration services tier includes, for example, the business integration services 108 and 122, and the business integration service shared workspace 114. In turn, the business integration services 108 and 122 may access distributed resources through various applications 112, 126, and 130 and the business integration service shared workspace 114. In one exemplary embodiment, the distributed resources include diverse and distributed operational support systems for local exchange carriers, vendors, competitors, trading partners, and data storage systems. In effect, the business integration service systems 108, 114, and 122 function to mediate the disparate data and functions resident in the resource systems by providing a consistent functional interface to client applications. In addition, the business integration service systems 108, 114, and 122 may provide additional functional capabilities not supported by the resource systems.

In one exemplary embodiment, the business integration services 108 and 122 and the business integration services shared workspace 114 represent one or more server systems providing computational functionality and data to the business application service 102 through the common integration bus 106 and adaptor 104. The business integration services 108 and 122 access one or more remote resource systems or applications 112, 126 and 130 through various adaptors 110, 124 and 128. The remote resources may include databases, usage systems, PREMIS systems, ASON systems, TIRKS® systems, Service Order Retrieval Distribution (SORD) systems, and CRIS systems. The business integration services 108 and 122 are organized to access such remote resources to acquire data or perform a requested function and to relay the data or result to the business application service 102. The business integration services 108 and 112 may perform functions such as product management, customer information management, order management, network resource management, service management, location information management, usage management, rating and pricing, bill preparation, and trouble administration.

For example, the business application service 102 may access data or functionality associated with the business integration service 108 through the adaptor 114 and communications integration bus 106. The business integration service 108 accesses a resource or application 112 through an adaptor 110 and provides data or function results to the business application service 102. As illustrated in connection with the business integration service 108, a single application 112 may be accessed through an adaptor 110. Alternatively, one or more applications may be accessed by a given business integration service through various adaptors. For example, business integration service 122 may access applications 126 and 130 through adaptors 124 and 128, respectively. In addition, the business application service 102 may access the business integration shared workspace 114. In one example, the business integration shared workspace 114 is coupled with data 116, process states 120 and rules 118. In this manner, data 116, process states 120, and rules 118 may be served or applied from a business integration service tier without accessing a remote resource application.

In one example, the business application service (BAS) 102 provides billing, fulfillment, and customer assurance functionality to various access interfaces. These functionalities are achieved by accessing the business integration services (BIS) 108 and 122 and the business integration services shared workspace 114. For example, an integrated billing service may be accomplished through a business application service (BAS) 102 accessing a business integrated service (BIS) 122, which acquires usage data from various subscriber systems, such as applications 126 and 130. In another example, address verification may be retrieved by a single business integration service (BIS) 108 accessing a resource application 112 associated with the requested address. Business application service (BAS) 102 functionality is achieved through interaction with one or more business integration services (BIS) 108 and 122,and the business integration services shared workspace 114, each having access to various combinations of applications, data, rules, and process states.

In general, users utilizing a variety of communications, protocols and methods access the business application service (BAS) 102. The business application service (BAS) 102 accesses an appropriate business integration service or business integration shared workspace to acquire data or to perform a function. The business integration service or business integration shared workspace accesses data in remote distributed systems to provide the desired functionality. In this manner, a common applications interface may be provided through the business application service 102 while functionality is performed on a variety of remote and diverse resource systems and applications 112, 126 and 130 and through a shared workspace 114.

In a particular embodiment, the BAS 102 includes a simple object access protocol (SOAP) interface. The BAS 102 may, for example, be a web services system and may provide a web-based interface to customers or customer service personnel. The BIS 108 or 122 may, for example, include object-oriented applications and the BIS 108 or 122 may be configured to communicate using an interface definition language (IDL), such as common object request broker architecture (CORBA) IDL. In one embodiment, the adapter 104 is configured to map CORBA IDL based communications to SOAP based communications.

Figure 2:
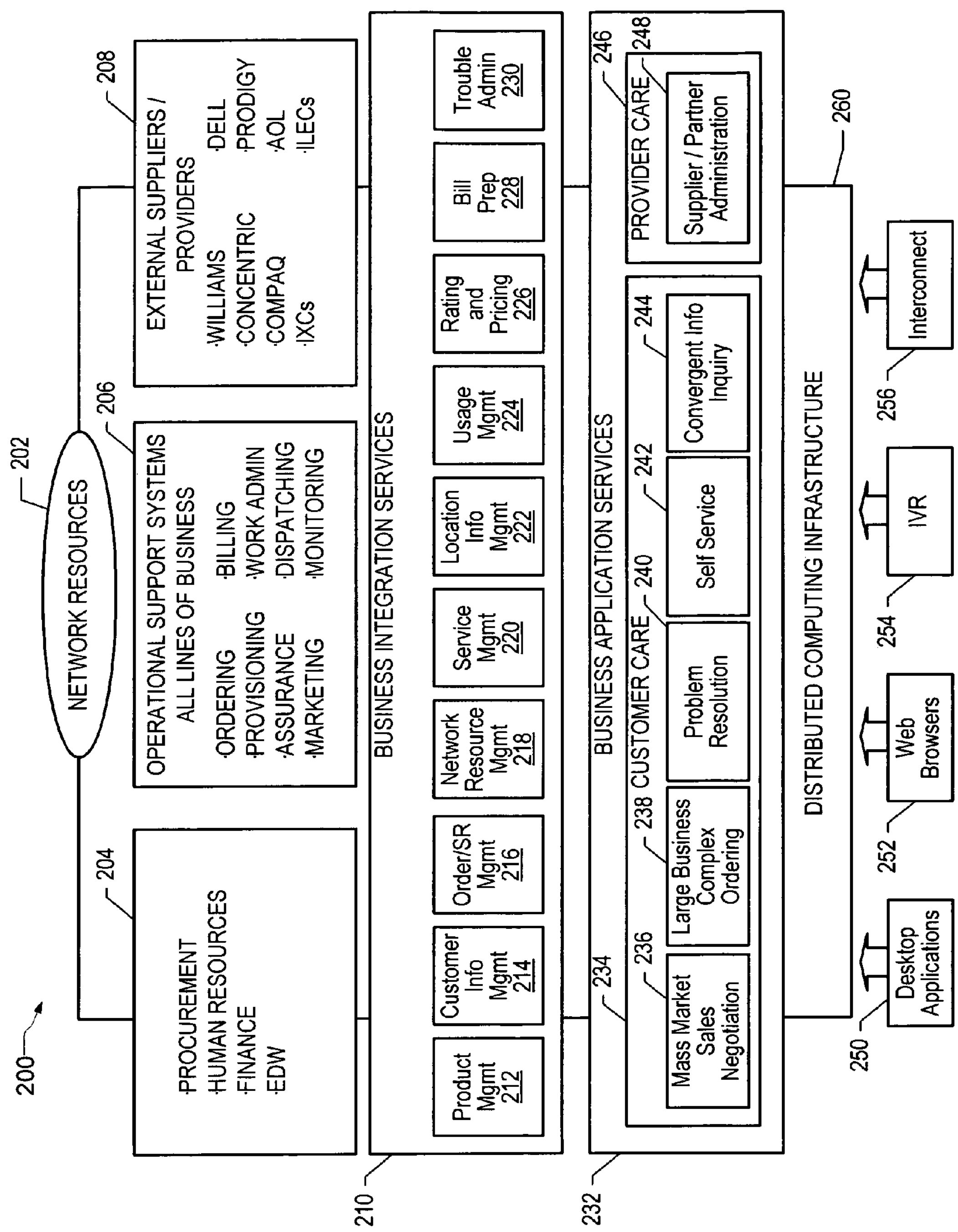

FIG. 2 depicts a further exemplary embodiment of an enterprise integration architecture 200. In this architecture 200, a variety of access methods are provided to diverse management and support systems. Access methods, such as desktop applications 250, web browsers 252, interactive voice response systems (IVRs) 254, and interconnection services 256 communicate to business application services (BAS) 232. The business application services (BAS) 232 access business integration services (BIS) 210 that in turn access a variety of diverse business management systems 204, operational support systems 206, and external suppliers and provider systems 208. In this manner, diverse access systems may influence the functionality of diverse resource systems and interfaces.

In one exemplary embodiment, the business application services (BAS) 232 are performed by one or more computational systems or servers. The business application services (BAS) 232 may, for example, include customer care services 234 and provider care services 246. The customer care services 234 may include mass market sales negotiation 236, large business complex ordering 238, problem resolution 240, self-service 242, and a convergent information inquiry 244. The provider care services 246 may include supplier or partner administration services 248. The business application services (BAS) 232 may function to control workflow processes and manage sessions and states. In one example, the business application services (BAS) 232 provide such functionality by accessing business integration services (BIS) 210.

In a further embodiment, the business integration services (BIS) 210 are performed by one or more computational systems or servers. The business integration services (BIS) 210 may, for example, manage and execute tasks and provide stateless business functions. Management and task execution may include providing interfaces, system integration, translation, coordination, scheduling, notification, caching, staging, and metadata repositories. Exemplary embodiments of the business integration services 210 include product management 212, customer information management 214, order/service request management 216, network resource management 218, service management 220, location information management 222, usage management 224, rating and pricing 226, bill preparation 228, and trouble administration 230. In one example, these business integration services 210 function to access diverse resource systems and interfaces through the shared distributed computing infrastructure 260. For example, the business integration services 210 may access business management systems 204. These business management systems 204 may include procurement, human resources, finances, and enterprise data warehouse (EDW) functionality. In some embodiments, the business management systems 204 may take the form of legacy database systems, such as SAP or Oracle databases, among other similar systems. The business integration services (BIS) 210 may also access operational support systems 206 through the shared distributed computing infrastructure 260. In one embodiment, these operational support systems 206 may include ordering, provisioning, assurance, marketing, billing, work administration, dispatching, and monitoring functions. Further, the business integration services (BIS) 210 may access external suppliers and providers 208 through the shared distributed computing infrastructure 260. In a telecommunications environment, these external suppliers and providers may include long distance companies, network resource suppliers, equipment suppliers, exchanges, and LECs, among others.

The shared distributed computing infrastructure 260 may include shared infrastructure functions, such as communications management, directory control, infrastructure management, security, and interconnection services. This infrastructure may be implemented using screen scraping such as SNA LU2, application peer-to-peer communications such as SNA-LU 6.2, IBM MQ Series, TCP/IP socket level programming, and other standard interfaces, such as CORBA, JAVA RMI/IIOP, JMS, JDBC, and message-oriented middle software. In a particular embodiment, the infrastructure 260 includes a proxy server or translation service to translate from SOAP to another IDL, such as OMG or CORBA IDL. For example, the BAS 232 may include a SOAP interface. In this embodiment, communications to and from the SOAP interface translate to and from another IDL using the translation services. In this manner, BIS 210 using other IDLs, such as CORBA IDL, may communicate with the BAS 232 using SOAP. In addition, the network resources 202 may include network equipment such as switches, routers, connections, and remote terminals.

In one exemplary embodiment, a consumer may access a system through a web browser 252. The web browser may direct communication with the business application services (BAS) 232, such as the consumer care services 234 (e.g., self service 242). This customer care service 234 may access a business integration services (BIS) module 210, such as the customer information management module 214. For example, the customer care services 234 may provide a SOAP interface that communicates with the customer information management module 214 through an IDL translator. The customer information management module 214 may selectively communicate with a business management system 204. Using such a communications path, a consumer may change their associated customer information. In this manner, consumers located in differing geographic regions may access a common website to change information on diverse resource systems.

In another example, a competitive local exchange carrier (CLEC) may access a business application service 232 through an interconnection service 256. The CLEC may attempt to validate an address or facilitate a channel facility assignment. The business application service 232 may access a module associated with the business integration service 210, such as the location information management module 222 or the network resource management module 218. In one example, the business integration service 210 accesses the business management systems 204 or the operational support systems 206 to facilitate the data transfer or functionality sought by the CLEC. In general, various examples can be envisioned that provide a diverse set of access points and protocols accessing a diverse set of resource systems and interfaces to provide a common set of application services. Particular embodiments may include SOAP interfaces that communicate with systems using other IDLs, such as CORBA IDL, via a translator.

Figure 3:
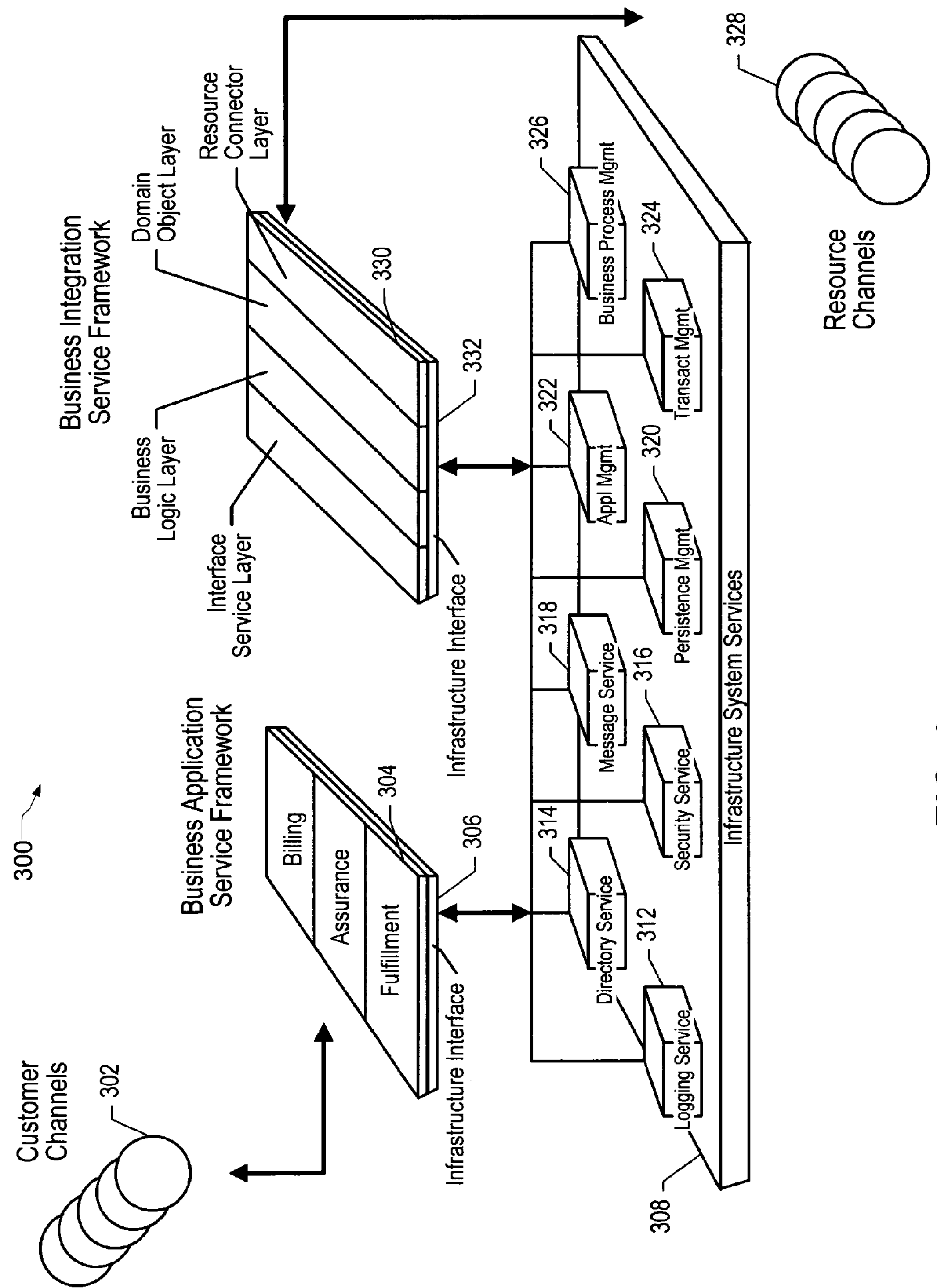

FIG. 3 depicts a further exemplary embodiment of an enterprise integration architecture. In this exemplary embodiment, various customer channels 302 access a business application services framework 304. This business application services (BAS) framework 304 has infrastructure interfaces 306 that access the infrastructure system services 308. In one exemplary embodiment, the business application services framework 304 provides various functionality including billing, assurance and fulfillment.

The infrastructure system services 308 provide the mechanisms and adaptations to enable information exchange. In one example, the infrastructure system services 308 include industry standard internet protocols and services, such as CORBA, JINI, and HTTP; interface and data representations, such as XML and IDL; integration enabling tools; adaptation design patterns; and naming services. The infrastructure system services 308 may include various functional modules, such as logging services 312, directory services 314, security services 316, message services 318, persistence management services 320, application management services 322, transactional management services 324, and business process management services 326. In a particular embodiment, the infrastructure system services 308 include adaptors or proxy servers that translate or map SOAP to other interface protocols, such as CORBA IDL.

In one exemplary embodiment, the infrastructure system services 308 provide an application management service 322, such as a software management capability. For example, software management capability may permit operation, administration, and maintenance capabilities. The infrastructure system services 308 may also provide a configuration policy rules interface. In one example, the process management services 326 provide a common rules repository for workflow and policy behavior. The security services 316 may apply common security policies across all layers and modules. For example, the permissions of initiators of object invocation may be validated prior to execution. Further, the logging services 312 may log communication between various modules. For example, requests and responses from the business application service and business integration service systems may be logged by logging services 312. Persistence management services 320 may control the caching of objects. Messaging services 318 may utilize messaging standards such as Java Messaging Services (JMS) to provide synchronous, asynchronous, point-to-point, and publish/subscribe messaging. Caching services may be used to improve processing time and data recovery, and to provide temporary persistence containers. Directory services 314 may be used for looking up distributed service registrations and may permit federation of name spaces across numerous software and hardware platforms. In addition, the infrastructure system services 308 may have infrastructure interfaces for providing common access specifications and translators or adapters for translating between protocols.

The business application services (BAS) framework 304 and the infrastructure systems services 308 may access a business integration services (BIS) framework 330 through an infrastructure interface 332. The business integration service framework 330 may include multi-layered logic. This multi-layered logic may include an interface services layer, a business logic layer, a domain object layer, and a resource connector layer. Through these layers, the business integration service framework 330 may connect with and interact with multiple diverse and distributed resource channels 328.

With such a system, distributed and diverse customer channels 302 may access a common application services framework 304. This framework 304 may take advantage of reusable infrastructure systems services 308 and the common business integration services framework 330 to facilitate communication with various distributed and diverse resources 328. For example, various CLECs may optionally access billing information through a variety of proprietary or standard protocols. The billing information can be retrieved from diverse resource channels 328 through common reusable infrastructure systems and frameworks.

Figure 4:
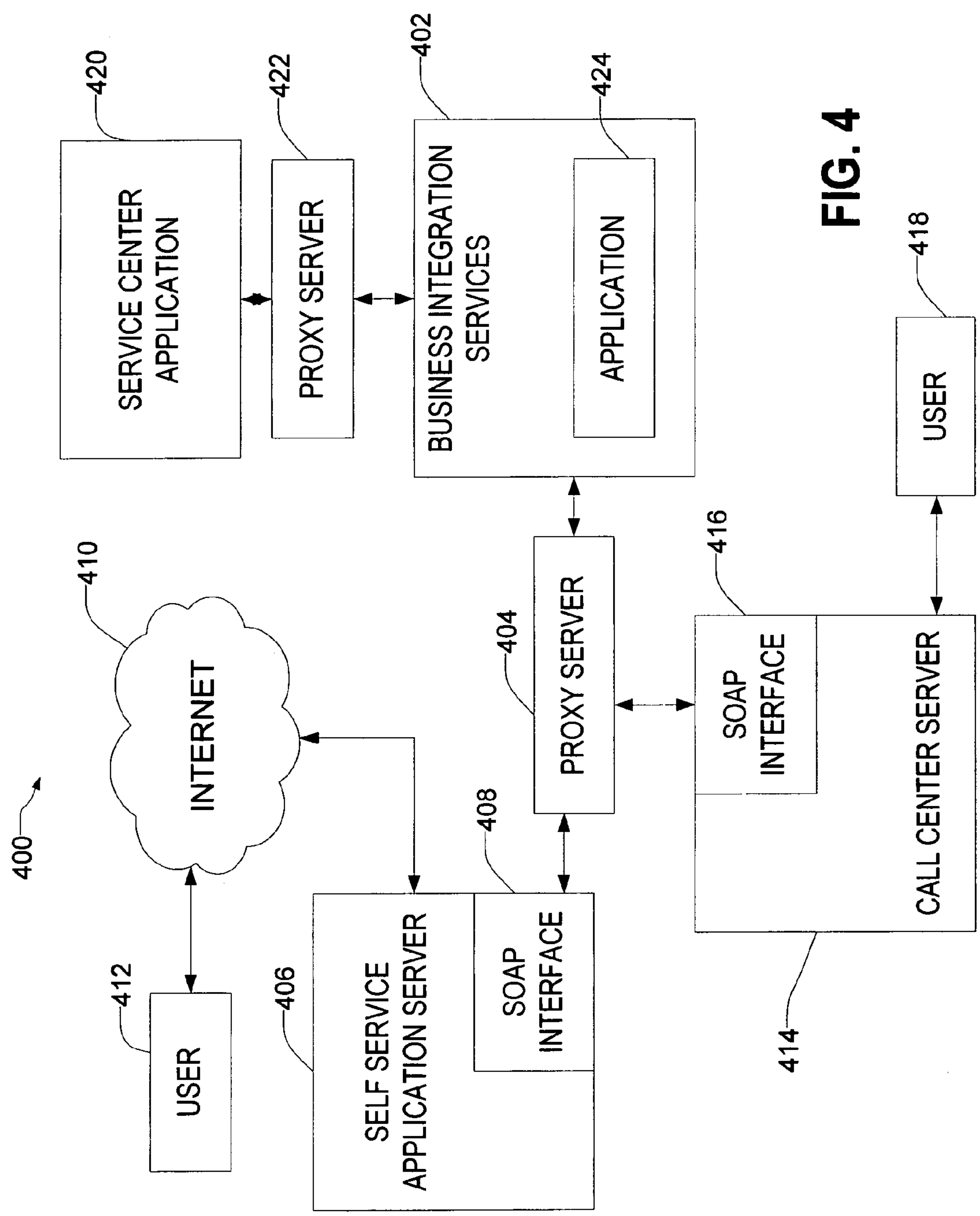

FIG. 4 includes another illustration of an exemplary enterprise architecture 400. The enterprise 400, for example, includes a business integration services (BIS) system 402 that includes an application 424. The business integration services (BIS) system 402 is accessible by business application services (BAS) systems via proxy service system 404. In one exemplary embodiment, the proxy service system 404 is a component of an infrastructure services system.

For example, a BAS system, such as self-service application server 406, may communicate with the proxy service server 404 using a SOAP interface 408. In another example, a call center system 414 may communicate with the proxy service server 404 using a SOAP interface 416. The proxy service server 404 may translate the SOAP based communications into IDL-based communications accessible by application 424. In a particular embodiment, the proxy service server 404 translates the SOAP based communication into remote method invocation (RMI) based communications. Alternatively, the proxy service server 404 translates the SOAP based communication into a common object request broker architecture (CORBA) IDL based communication.

In addition, the BIS system 402 may be accessed by other object based systems. For example, the service center application server 420 may be configured to communicate using an object request broker, such as a common object request broker architecture (CORBA). The proxy system 422 may be configured to translate between the object request broker architecture and another architecture, such as RMI.

In a particular example, the enterprise architecture 400 may be useful for performing transactions related to product ordering. Product availability may be influenced by a user's address. For example, availability of telecommunication services, such as digital subscriber lines (DSL), is affected by location of a subscriber or user. As such, interfaces useful in establishing an order may desire data associated with product availability. In one example, a user 412 accesses a self-service application server 406 via the Internet 410. The self-service application server 406 accesses a product availability application, such as application 424, located on BIS system 402 via the proxy service server 404. In one embodiment, the self-service application server 406 communicates via the SOAP interface 408 to the proxy service server 404. The proxy service server 404 translates SOAP based communication into an IDL based communication, such as CORBA IDL based communication, accessible by an object-oriented application, for example, the application 424. In response, the application 424 provides an IDL based communication to the proxy service server 404. The proxy service server 404 translates the IDL based communication into a SOAP based communication and sends the SOAP based communication to the SOAP interface 408. The self-service application server 406 may use the data provided through the SOAP interface 408 to process an order by the user 412.

In an alternative embodiment, a user 418 may call a call center 414. The call center 414 may include personnel or automated systems that facilitate placing an order. The call center system 414 accesses the application 424 using a SOAP interface 416 through proxy service server 404. As such, several BAS systems utilizing SOAP interfaces may access applications located on the BIS system 402 via the proxy service server 404.

Figure 5:
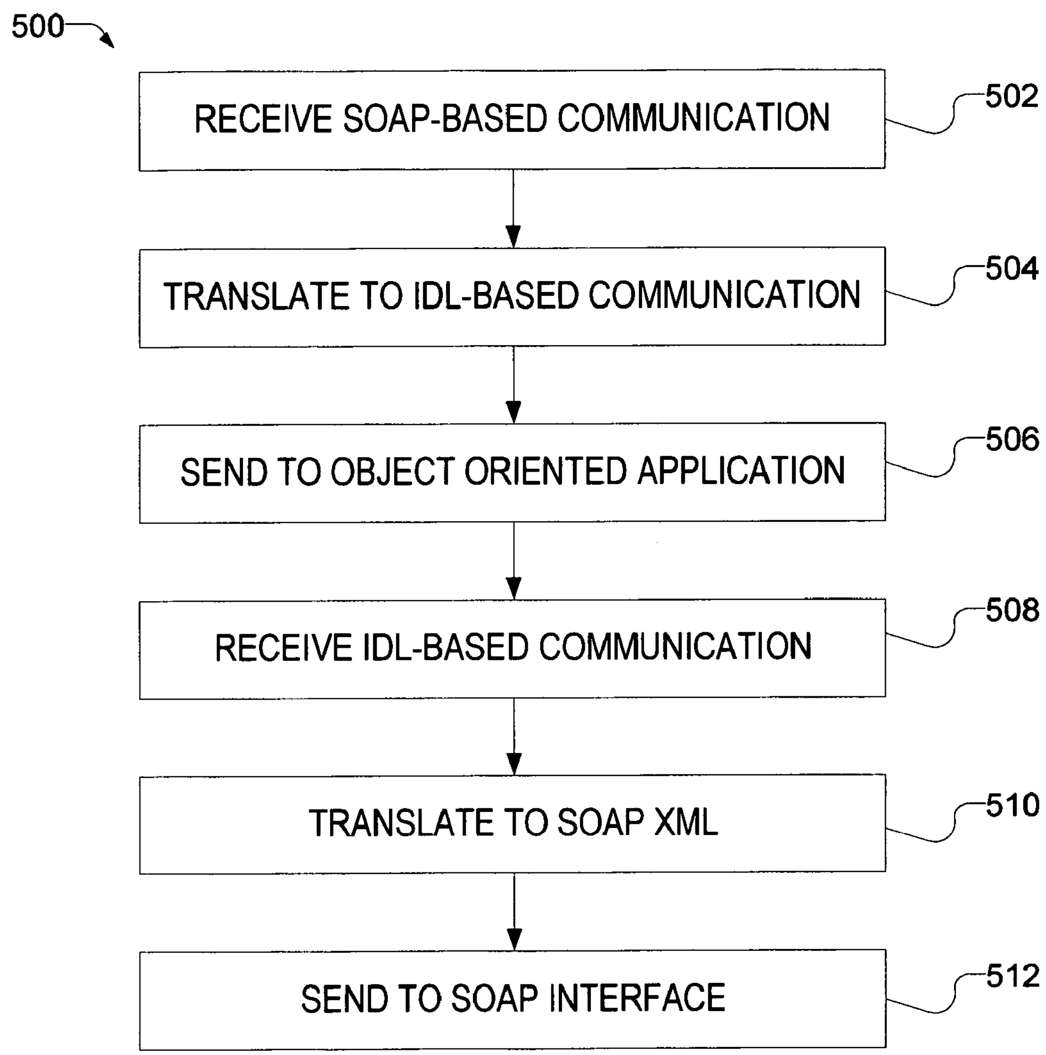
FIGS. 5, 6, 7, 8, 9, 10, and 11 include illustrations of exemplary methods for use in an enterprise architecture, such as with the enterprise architectures illustrated in FIGS. 1, 2, 3 or 4.

FIG. 5 includes an illustration of an exemplary method 500 for communicating between an IDL based system and a SOAP based interface. The method 500 includes receiving a SOAP based communication, as illustrated at 502. The proxy system translates the SOAP based communication to an IDL based communication, as illustrated at 504. For example, the proxy system may process XML schema and data and translate the schema and data into object and variable definitions and data useful in an IDL based communication. As illustrated at 506, the IDL based communication is sent to an object oriented application. In response, the object-oriented application sends an IDL based communication to the proxy system. The proxy system receives the IDL based communication, as illustrated at 508, and translates the communication to a SOAP based communication, as illustrated at 510. For example, the IDL based communication may be processed to provide an XML schema and data. The XML schema and data may be sent to a SOAP interface, as illustrated at 512.

Figure 6:
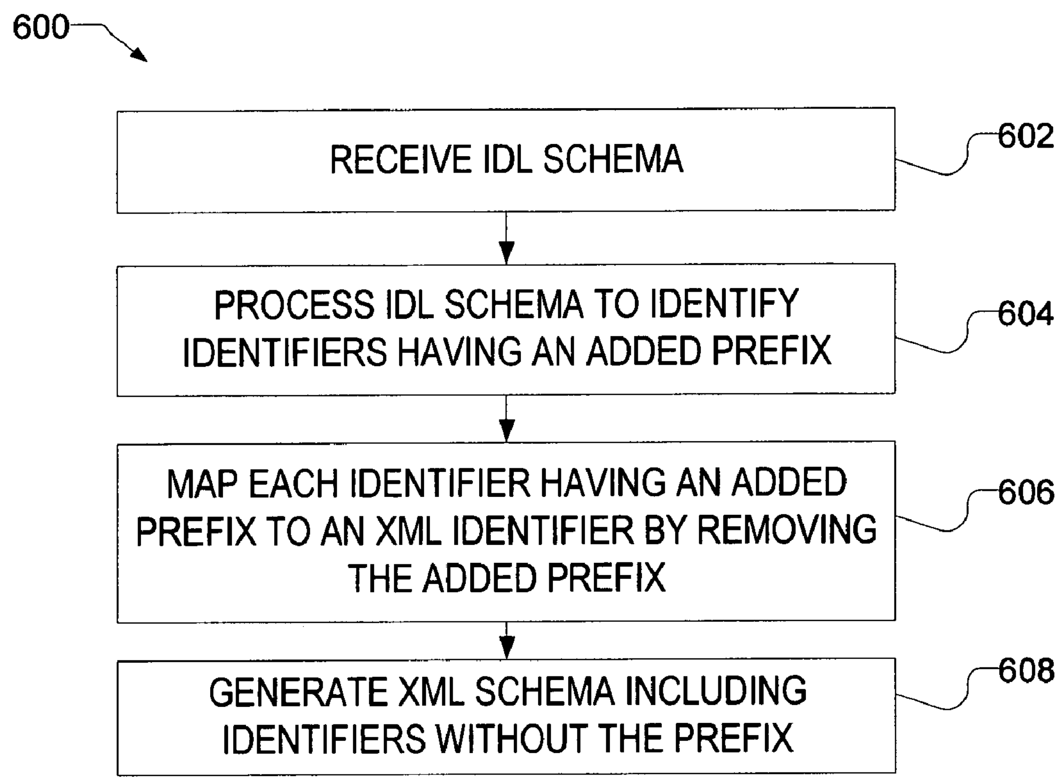

FIGS. 6, 7, 8, 9, 10 and 11 include illustrations of exemplary methods for processing IDL based communications. While the methods below are described in terms of CORBA IDL translation to SOAP, converse methods are envisaged for translating SOAP to CORBA IDL. FIG. 6 includes an illustration of an exemplary method 600 for mapping an IDL based communication to a SOAP based communication. Standard IDLs, such as the Object Management Group (OMG) defined IDL are case insensitive. However, typical XML schema are case sensitive. In one exemplary embodiment, a BIS IDL uses the convention of preceding each identifier with a prefix to avoid naming collisions with types. In the exemplary method 600, prefixes are removed from the identifiers when establishing an XML schema. For example, the proxy system may receive an IDL based communication, as illustrated at 602, and process the IDL based communication to identify identifiers having an added prefix, as illustrated at 604. In one particular embodiment, IDLs use a lower case prefix such as a single letter, for example the letter "a", to indicate a particular identifier. Each identifier having an added prefix is mapped to an XML identifier by removing the added prefix from the front of the identifier, as illustrated at 606. For example, the letter "a" may be removed from the front of an identifier and the identifier without the "a" may be used in creating the XML schema. In addition, the first letter following the prefix may be reduced to lower case.

For example, an IDL schema:

```
struct AnnualReport {
    BalanceSheet        aBalanceSheet;
    IncomeStatement     aIncomeStatement;};
```

may be translated to an XML schema:

```
<complexType name = "AnnualReport"
    <sequence>
        <element name="balanceSheet" type="BalanceSheet"/>
        <element name="incomeStatement" type="IncomeStatement"/>
    </sequence>
</complexType>
```

The proxy system may generate the SOAP based communication including the schema and data, as illustrated at 608. The schema includes the identifier without the prefixes. A converse of the method may be used to translate a SOAP based communication to an IDL based communication.

Figure 7:
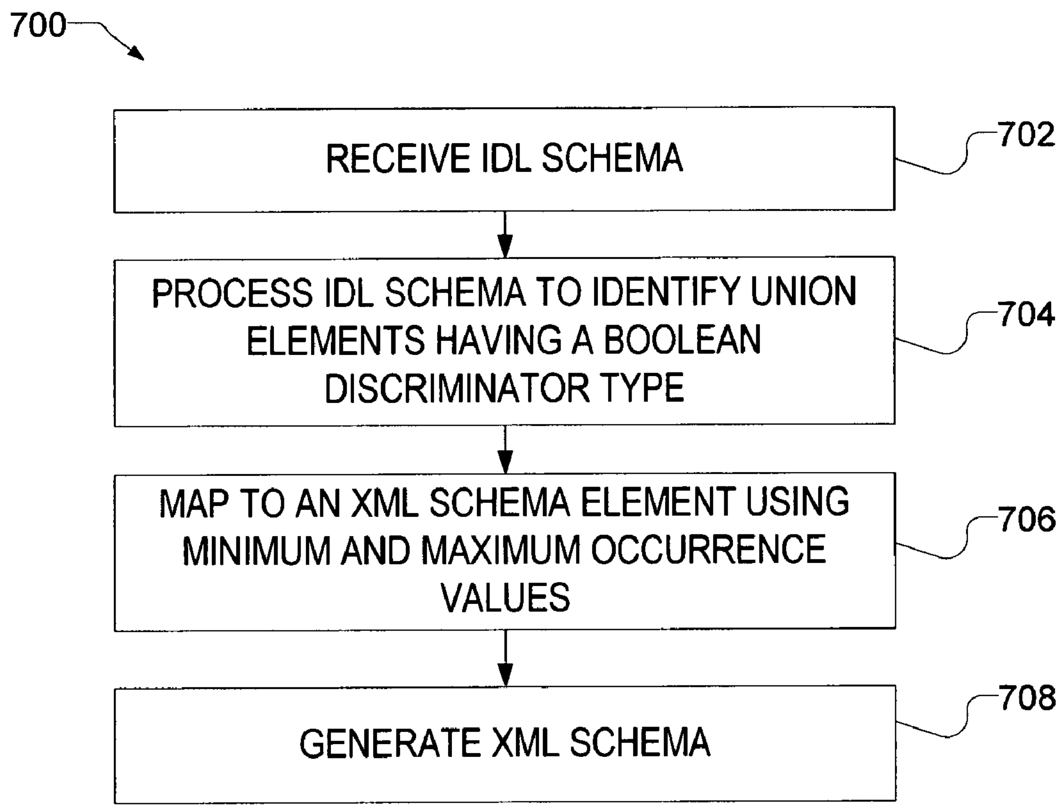

In one exemplary embodiment, the BIS IDL includes optional elements that are typed via a union with a boolean discriminator. In one example, the proxy system may map the IDL schema to an XML schema that includes minimum and maximum occurrence values. For optional elements, the minimal occurrence value may be set to zero. FIG. 7 includes an illustration of an exemplary method 700 for processing IDL based communications including optional elements. For example, the proxy system may receive an IDL schema, as illustrated at 702, and may process the schema to identify union elements having a boolean discriminator type, as illustrated at 704. In addition, the union element may have a type having "Opt" as the last three letters. The proxy system maps the union element having the boolean discriminator types to XML schema using minimum and maximum occurrence values that are different, as illustrated at 706. In one exemplary embodiment, the optional elements have a minimum occurrence value of zero. In another exemplary embodiment, the optional elements have maximum occurrence values equal to one.

For example, an IDL schema:

```
union StringOpt switch (Boolean) {
      case true: string theValue; };
// Middle Name is Optional
struct Name {
      string          aFirstName;
      StringOpt       aMiddleName;
      string          aLastName; };
```

may be translated into an XML schema:

```
<complexType name="Name">
      <sequence>
            <element name="firstName" type="string" minOccurs="1"
            maxOccurs="1" />
            <element name="middleName" type="string" minOccurs="0"
            maxOccurs="1" />
            <element name="lastName" type="string" minOccurs="1"
            maxOccurs="1" />
      </sequence>
</complexType>
```

An exemplary instance of the XML schema is

```
<name>
      <firstName>John</firstName>
      <middleName>T</middleName>
      <lastName>Smith</lastName>
</name>
```

The SOAP communication may be generated to include the XML schema and data and forwarded to a SOAP interface, as illustrated at 708. A converse of the method may be used to translate a SOAP based communication to an IDL based communication.

Figure 8:
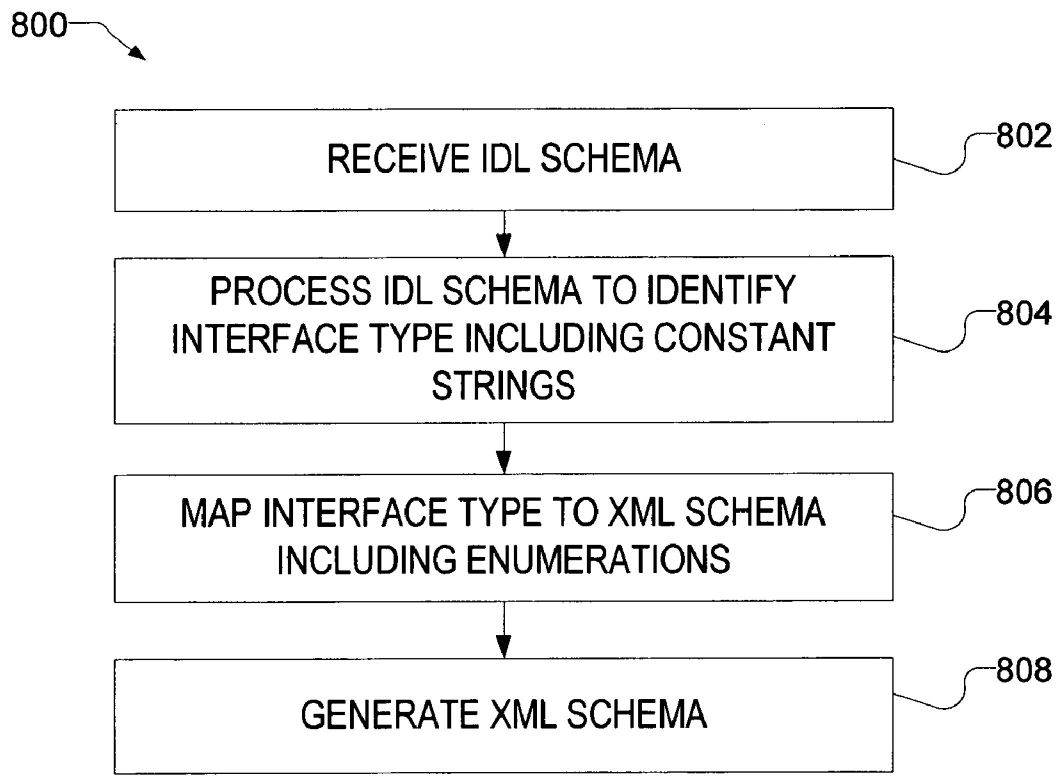

In a further example, a BIS IDL may include interface types that include constant strings, such as including strings that are all constant strings. In a particular example, the interface type only includes constant strings. The proxy system may translate these interface types into XML schemas using XML schema enumerations. FIG. 8 includes an exemplary method 800 for processing IDL communications including interface types that include constant strings.

For example, the proxy system may receive an IDL schema, as illustrated at 802, and process the schema to identify the interface types that include constant strings, as illustrated at 804. The constant strings are mapped to an XML schema including enumerations, as illustrated at 806.

For example, an IDL schema:

```
interface BisContextPropertyValue {
      const string APPLICATION="Application";
      const string BUSINESSUNIT="BusinessUnit";
      const string USERID="UserId"; };
```

may be mapped to XML schema:

```
<simpleType name="Name">
      <restriction base="string">
```

-continued

```
            <enumeration>Application</enumeration>
            <enumeration>BusinessUnit</enumeration>
            <enumeration>UserId</enumeration>
      </restriction>
</simpleType>
```

The XML may be generated and forwarded to a SOAP interface, as illustrated at 808. A converse of the method may be used to translate a SOAP based communication to an IDL based communication.

Figure 9:
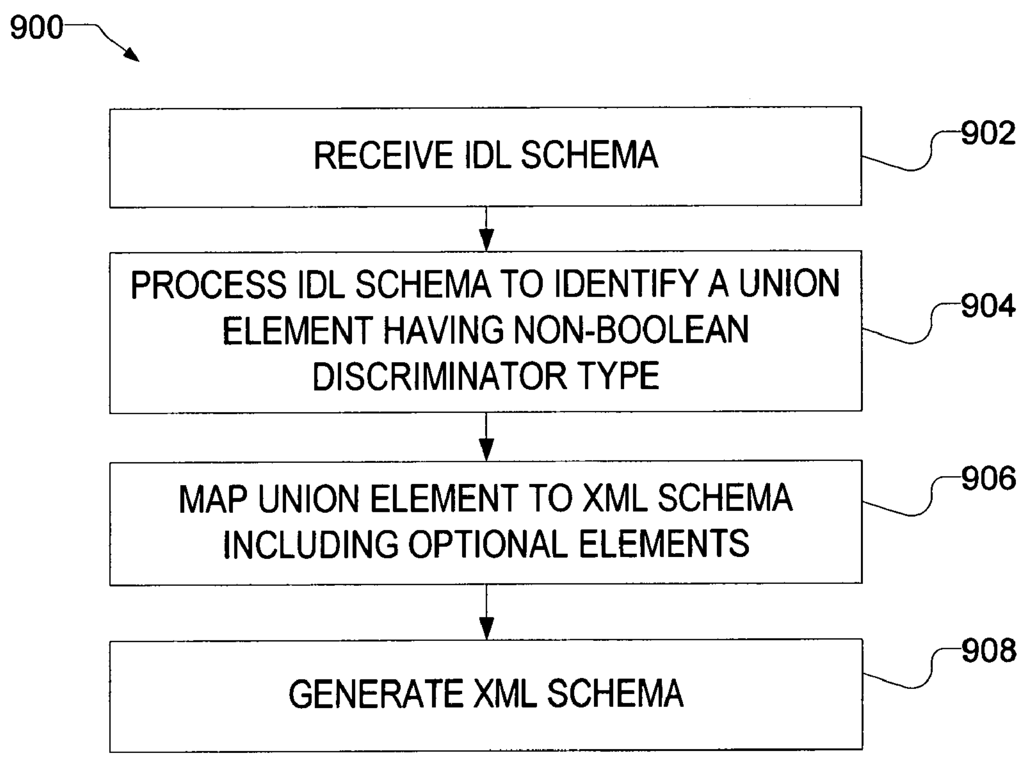

In another example, IDL choice types are provided using unions with a discriminator type that is not boolean. The unions whose discriminate type is not boolean may be mapped to an XML schema sequence whose numbers are optional. Typically, the name of the XML schema type will be the name of the IDL union. In a particular example, the enumeration IDL types are not mapped to an XML schema type. FIG. 9 includes an illustration of an exemplary method 900 for processing IDL unions whose discriminator types are not boolean. For example, the proxy system may receive an IDL schema, as illustrated at 902, and process the schema to identify union elements having non-boolean discriminator types, as illustrated at 904. The proxy system may map the union elements to an XML schema including optional members, as illustrated at 906. For example, the minimal occurrence values of each of the elements in the XML schema may be set to zero.

For example, an IDL schema:

```
enum AddressChoice {
      FIELDED_CHOICE,
      UNFIELDED_CHOICE };
union Address switch(AddressChoice) {
      case FIELDED_CHOICE: FieldedAddress    aFieldedAddress;
      case UNFIELDED_CHOICE: UnfieldedAddress
      aUnfieldedAddress;};
union AddressOpt switch(boolean) {
      case TRUE: Address theValue; };
```

may be mapped to an XML schema:

```
<complexType name="Address">
      <sequence>
            <element name="fieldedAddress" type="FieldedAddress"
                  minOccurs="0" maxOccurs="1"/>
            <element name="unfieldedAddress" type="UnfieldedAddress"
                  minOccurs="0" maxOccurs="1"/>
      </sequence>
</complexType>
```

Using the XML schema, an XML document may be generated and forwarded to a SOAP interface, as illustrated at 908. A converse of the method may be used to translate a SOAP based communication to an IDL based communication.

Figure 10:
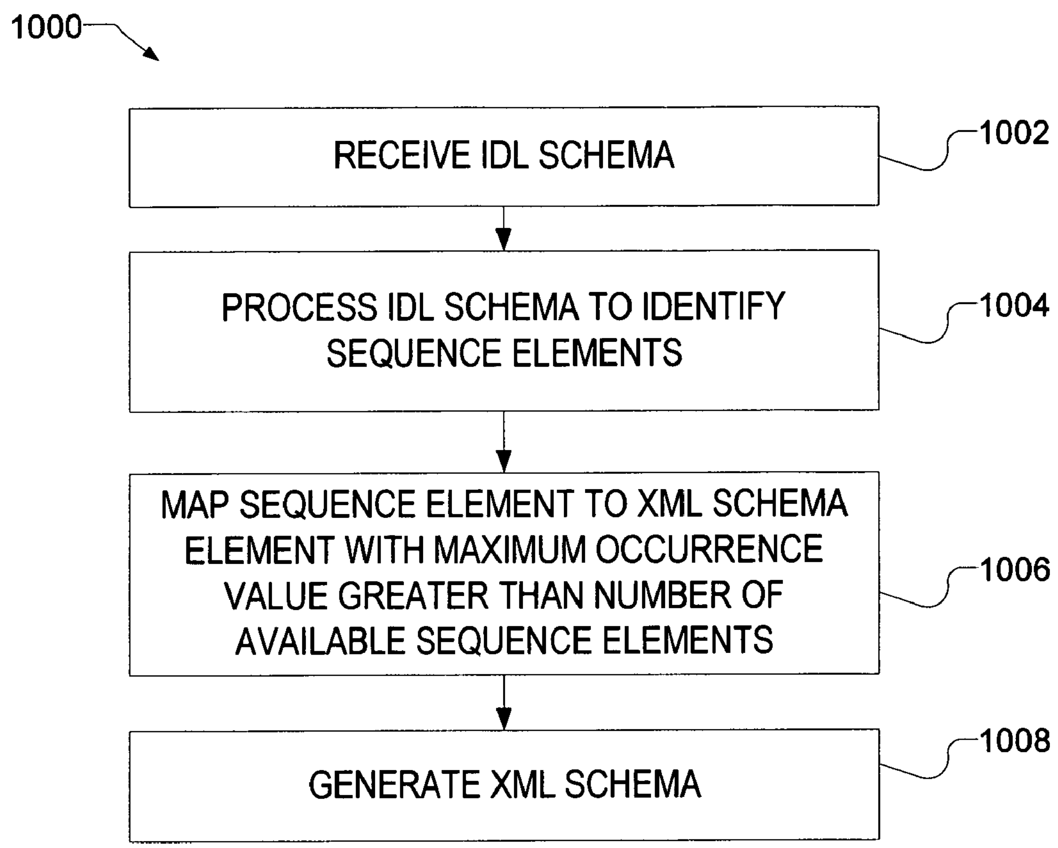

Arrays in OMG IDL may be specified using sequence keywords. These sequences may be mapped to an XML schema using XML sequences. FIG. 10 includes an illustration of an exemplary method 1000 for processing IDL communications including sequences. For example, the proxy system receives an IDL schema, as illustrated at 1002, and processes the schema to identify sequence elements, as illustrated at 1004. The sequence elements are mapped to XML schema in which the max occurrence values are high, such as greater than the available number of sequence elements. For example, the max occurrence value in the XML schema may have a value of unbounded, as illustrated at 1006.

For example, an IDL schema:

```
typedef sequence<string> StringSeq;
or
struct MyStruct{ sequence<string> aArrayOfStrings;};
```

may be mapped to an XML schema:

```
<complexType name="StringSeq">
    <sequence>
        <element name="item" type="string" minOccurs="0"
        maxOccurs="unbounded"/>
    </sequence>
</complexType>
```

The XML schema utilizing the XML sequence and data is generated, as illustrated at 1008, and forwarded to a SOAP interface. A converse of the method may be used to translate a SOAP based communication to an IDL based communication.

Figure 11:
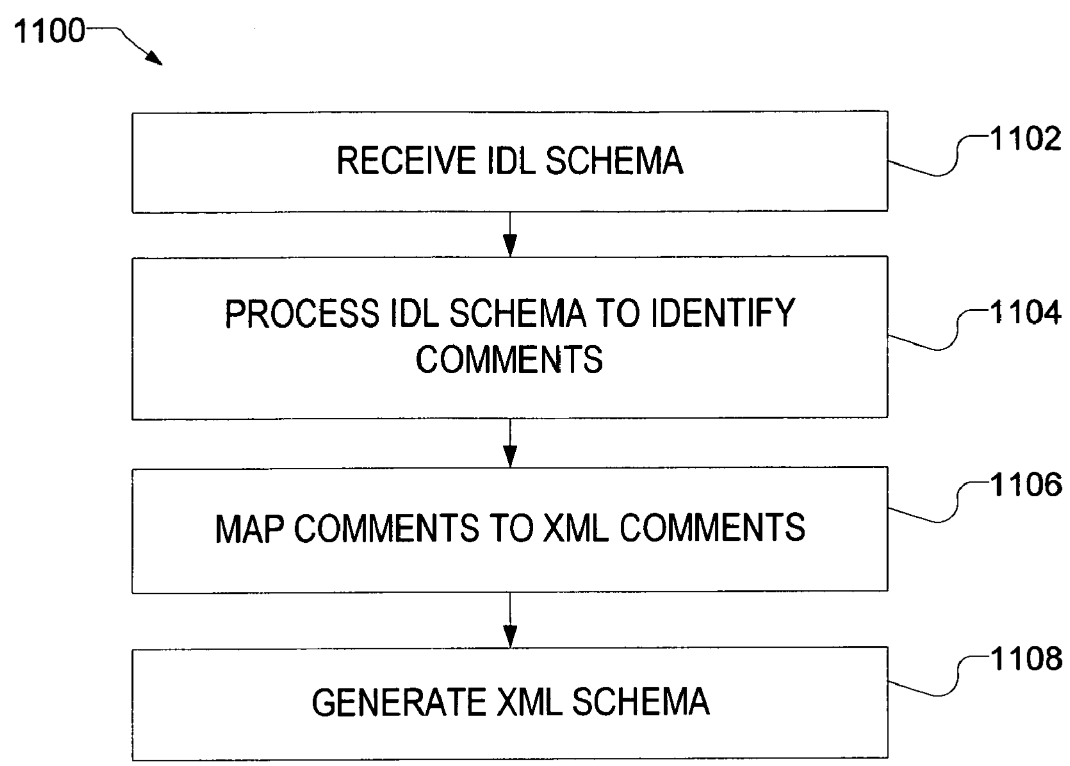

Comments may be processed from the IDL based communications to XML schema to avoid losing information. FIG. 11 includes an illustration of an exemplary method 1100 for processing IDL based comments. For example, the method 1100 includes receiving an IDL based schema, as illustrated at 1102, and processing the schema to identify comments, as illustrated at 1104. The comments are mapped to XML, as illustrated at 1106, and the XML schema is generated and forwarded to a SOAP interface, as illustrated at 1108. A SOAP based communication may be processed to formulate an IDL based communication having comments using a converse method.

Particular embodiments of the above methods may be implemented in computer operable instructions and stored on computer readable media. Such computer operable instructions may be software operable by a processor to perform portions of the above methods. The computer readable media may include electronic, electromagnetic, and optical media. In a particular embodiment, the computer readable media storing the computer operable instructions is a proxy server.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of mapping an interface definition language (IDL) based communication to a simple object access protocol (SOAP) based communication, the method comprising:

receiving an IDL schema at a proxy service server from a business integration services system;

processing the IDL schema to:

identify IDL identifiers having an added prefix, the added prefix added to avoid a naming conflict with respect to a type within the IDL schema, identify a first IDL union element having a boolean discriminator type, the first IDL union element including a portion that indicates a first optional element, and identify an IDL interface type that includes a constant string;

mapping each of the IDL identifiers having the added prefixes by removing the added prefixes to produce prefix-less identifiers;

mapping the first optional element of the first IDL union element to a first XML schema type including an optional XML schema sequence element having a minimum occurs value of zero that differs from a maximum occurs value;

mapping the IDL interface type to a second XML schema type by creating an XML schema enumeration having a value set to a string value of the constant string;

generating an XML schema including the prefix-less identifiers, the first XML schema type, and the second XML schema type including the XML schema enumeration; and sending the XML schema from the proxy service server to a business application services system.

2. The method of claim 1, further comprising:

processing the IDL schema to identify a second IDL union element having a non-boolean discriminator type, the second IDL union element including one or more second optional elements;

mapping the second IDL union element to an XML schema sequence that includes one or more XML schema sequence elements, each XML schema sequence element corresponding to a respective second optional element; and wherein the generated XML schema includes the XML schema sequence.

3. The method of claim 1, further comprising:

processing the IDL schema to identify IDL sequence elements;

mapping the IDL sequence elements to a third XML schema type including a high maximum occurrence value; and wherein the generated XML schema includes the third XML schema type.

4. The method of claim 3, wherein the maximum occurrence value is unbounded.

5. A method of mapping an object request broker interface definition language (IDL) based communication to a simple object access protocol (SOAP) based communication, the method comprising:

receiving an IDL schema at a proxy service server from a business integration services system;

processing the IDL schema to identify an IDL union element having a boolean discriminator type, the IDL union element including a portion that indicates an optional element;

mapping the optional element of the IDL union element to an XML schema sequence element with a minimum occurs value of zero that differs from a maximum occurs value;

generating an XML schema to include the XML schema sequence element; and sending the XML schema from the proxy service server to a business application services system.

6. The method of claim 5 wherein the maximum occurs value is set to one.

7. A method of mapping an object request broker interface definition language (IDL) based communication to a simple object access protocol (SOAP) based communication, the method comprising:

receiving an IDL schema at a proxy service server from a business integration services system;

processing the IDL schema to identify an IDL interface type that includes only one or more IDL constant strings;

mapping the IDL interface type to an XML schema type by creating one or more XML schema enumerations, wherein each of the one or more XML schema enumerations is identified as an enumeration and is associated with a respective IDL constant string that is identified as a constant, and each of the one or more XML schema enumerations having a value set to a string value of the respective IDL constant string;

generating an IXML schema to include the one or more XMIL schema enumerations; and sending the XML schema from the proxy service server to a business application services system.

8. A method of mapping an object request broker interface definition language (IDL) based communication to a simple object access protocol (SOAP) based communication, the method comprising:

receiving an IDL schema at a proxy service server from a business integration services system;

processing the IDL schema to identify an IDL union element having a non-boolean discriminator type and to identify an IDL union element having a boolean discriminator type, the IDL union element including one or more optional elements;

mapping the IDL union element to an XML schema sequence that includes one or more XML schema sequence elements, each XML schema sequence element corresponding to a respective optional element, wherein the XML schema sequence elements corresponding to the respective optional element of the IDL union element with the boolean discriminator type has a minimum occurs value of zero that differs from a maximum occurs value;

generating an XML schema to include the XML schema sequence; and sending the XML schema from the proxy service server to a business application services system.

9. A proxy server system to map interface definition language (IDL) based communication to a simple object access protocol (SOAP) based communication, the system comprising:

a data input to receive IDL data items to be mapped to an XML data item a data output to provide a SOAP output including the XML data item;

a processor responsive to the data input and coupled to the data output, the processor including computer instructions to:

process an IDL schema to identify IDL identifiers having an added prefix, the added prefix added to avoid a naming conflict with respect to a type within the IDL schema, to identify a first IDL union element having a boolean discriminator type and including a portion that indicates a first optional element, and to identify an IDL interface type that includes a constant string;

map each of the IDL identifiers having the added prefixes by removing the added prefixes to produce prefix-less identifiers;

map the first optional element of the IDL union element to a first XMIL schema type including an optional XML schema sequence element having a minimum occurs value of zero that differs from a maximum occurs value;

map the IDL interface type to a second XML schema type by creating an XML schema enumeration having a value set to a string value of the constant string; and generate an XML schema including the prefix-less identifiers, the first XML schema type, and the second XML schema type including the XML schema enumeration.

10. The system of claim 9, wherein the computer instructions within the computer processor further process the IDL schema to identify a second IDL union element having a non-boolean discriminator type and including one or more second optional elements, map the second IDL union element to an XML schema sequence that includes one or more XML schema sequence elements, each XML schema sequence element corresponding to a respective second optional element, wherein the generated XML schema includes the XML schema sequence.

11. The system of claim 9, wherein the computer instructions within the computer processor further process the IDL schema to identify IDL sequence elements, map the IDL sequence elements to a third XML schema type including a high maximum occurrence value, and wherein the generated XML schema includes the third XML schema type.

12. The system of claim 9,wherein the data output sends a message based on SOAP to a remote system.

13. The system of claim 12, wherein the remote system is a remote call center system having a SOAP interface.

14. The system of claim 12, wherein the remote system is a remote self-service system having a SOAP interface, the self-service system further responsive to user requests communicated over the internet.

15. The system of claim 9, wherein the data input is configured to receive IDL data items from a remote system including application objects.

16. The system of claim 15, wherein the application objects are JAVA objects.

17. A computer enterprise system comprising:

a business application service (BAS) system including a simple object access protocol (SOAP) interface;

a business integration services (BIS) system including a common object request broker architecture (CORBA) interface definition language (IDL) interface; and an integration services system coupled to the BAS system and coupled to the BIS system, the integration services system including a proxy server configured to:

identify an IDL union element having a boolean discriminator type, the IDL union element including a portion that indicates an optional element;

map the optional element of the IDL union element to an XML schema sequence element with a minimum occurs value of zero that differs from a maximum occurs value; and generate an XML schema to include the XML schema sequence element.

18. The computer enterprise system of claim 17, wherein the BAS system includes customer care services and provider care services.

19. The computer enterprise system of claim 17, wherein the BIS system is configured to provide functionality selected from the group consisting of product management, customer information management, order management, network resource management, service management, location information management, usage management, rating and pricing, bill preparation, and trouble administration.

20. The computer enterprise system of claim 17, wherein the integration services system provides communications management, directory control, infrastructure management, security, and interconnection services.

21. The method of claim 1, wherein the added prefix is a lower case letter.

22. The method of claim 1, wherein mapping each of the IDL identifiers includes changing the case of the first letter of the remaining identifier to lower case.

23. The method of claim 5, wherein the IDL union element includes an optional element identifier and the optional element of the IDL union element is identified based on the optional element identifier of the IDL union element.

24. The method of claim 23, further comprising:

identifying an additional IDL union element having the boolean discriminator type, the additional IDL union element including a portion that indicates an additional optional element and including the optional element identifier;

wherein the additional optional element is identified based on the optional element identifier.

25. The method of claim 8, further comprising:

mapping a user defined IDL case label type associated with at least one optional element of the IDL union element with an XML type based on the user defined IDL case label type;

wherein each respective XML schema sequence element associated with the at least one optional element includes the XML type.

* * * * *